United States Patent
Wong et al.

(10) Patent No.: US 9,519,152 B2
(45) Date of Patent: Dec. 13, 2016

(54) 3D DISPLAY ALIGNMENT METHOD

(71) Applicants: Chi Shing Wong, Kwai Chung (HK); Man Lai Chau, Kwai Chung (HK); Yuet Wu, Kwai Chung (HK); Jiang Wen Deng, Kwai Chung (HK); Wing Hong Leung, Kwai Chung (HK)

(72) Inventors: Chi Shing Wong, Kwai Chung (HK); Man Lai Chau, Kwai Chung (HK); Yuet Wu, Kwai Chung (HK); Jiang Wen Deng, Kwai Chung (HK); Wing Hong Leung, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 293 days.

(21) Appl. No.: 14/099,227

(22) Filed: Dec. 6, 2013

(65) Prior Publication Data

US 2015/0162362 A1    Jun. 11, 2015

(51) Int. Cl.
| | |
|---|---|
| *G02B 27/22* | (2006.01) |
| *H04N 13/04* | (2006.01) |
| *G02F 1/13* | (2006.01) |
| *G02F 1/1333* | (2006.01) |

(52) U.S. Cl.
CPC ...... *G02B 27/2214* (2013.01); *H04N 13/0409* (2013.01); *H04N 13/0425* (2013.01); *G02F 1/1303* (2013.01); *G02F 2001/133354* (2013.01); *Y10T 29/49002* (2015.01); *Y10T 29/5313* (2015.01)

(58) Field of Classification Search
CPC ...... G02F 1/1225; G02F 1/29; G02F 2201/56; G02F 2203/00; G02F 1/1303; G02B 27/2214; H04N 13/0409; H04N 13/0425; Y10T 29/5313
IPC ...... G02F 1/1335
See application file for complete search history.

(56) References Cited

U.S. PATENT DOCUMENTS

| | | | | |
|---|---|---|---|---|
| 6,023,313 A | * | 2/2000 | Hazama | B32B 38/1833 349/158 |
| 6,204,895 B1 | * | 3/2001 | Nakamura | G02F 1/133526 349/187 |

(Continued)

FOREIGN PATENT DOCUMENTS

WO    WO 2007/083925    7/2007

*Primary Examiner* — Carl Arbes
(74) *Attorney, Agent, or Firm* — Ostrolenk Faber LLP

(57) ABSTRACT

There is provided an apparatus for alignment of a thin-film transistor (TFT) panel and a barrier panel of a three-dimensional (3D) display. The apparatus comprises at least one light source for illuminating pixels in at least one region of the TFT panel and for illuminating at least one region of an exposure pattern of the barrier panel; a pattern recognition system for detecting light emitted from the at least one light source that is reflected by or transmitted through the 3D display, to generate alignment data relating to an alignment between the detected illuminated pixels of the TFT panel and the exposure pattern of the barrier panel; and a positioning mechanism for adjusting the relative position between the barrier panel and the TFT panel in relation to the alignment data. The at least one light source comprises at least one invisible light source which emits invisible light outside the visible region of the electromagnetic spectrum.

7 Claims, 5 Drawing Sheets

(56) References Cited

U.S. PATENT DOCUMENTS

| | | | | |
|---|---|---|---|---|
| 6,373,548 B1 * | 4/2002 | Kim | .................. | G02F 1/1333 |
| | | | | 257/797 |
| 6,502,324 B2 * | 1/2003 | Noguchi | ........... | G02F 1/133526 |
| | | | | 250/491.1 |
| 7,630,067 B2 * | 12/2009 | Nimmakayala | ........ | B82Y 10/00 |
| | | | | 356/139.04 |

* cited by examiner

3D DISPLAY ALIGNMENT METHOD

TECHNICAL FIELD

The present disclosure relates to a method of, and apparatus for, aligning panels of a digital display.

BACKGROUND

Digital displays are widely used in a number of devices, including televisions and portable devices such as mobile phones, notebook computers, and tablet computers. Some digital displays, such as three-dimensional (3D) digital displays, incorporate special combinations of panels to allow them to produce particular visual effects to a viewer. For example, in a 3D digital display, a barrier panel (also known as a parallax barrier) is aligned with and in overlying relationship with a thin-film transistor (TFT) panel of the display. The barrier panel contains an exposure pattern comprising a plurality of slits or a lattice of apertures to allow selective exposure of the underlying TFT panel. At a given viewing angle, a viewer's left eye will see light emitted by different pixels differently from the right eye, thus producing an autostereoscopic effect to the viewer.

In order for the stereoscopic effect to work as desired, it is necessary to precisely align the barrier panel with the TFT panel prior to lamination.

Traditionally, alignment of the digital display panels requires that a backlight unit of the display be lit up, or that special alignment patterns be applied to borders of both the TFT panel and the barrier panel, or be displayed on the TFT panel.

For example, PCT publication WO2007/083925 discloses a method for attaching a display panel for a stereoscopic image. A stereoscopic camera (double camera) system is used to simulate the human visual system (the two cameras representing the left and right eyes respectively). A stereoscopic image composed of interlaced left eye and right eye images is displayed on a stereoscopic panel which overlaps with a backlit display module, the backlighting being turned on. The cameras record the stereoscopic image and the relative positions of the stereoscopic panel and display module are adjusted until the left and right eye images are distinguishable in the respective cameras. A disadvantage of this method is that the display panel needs to be electrically connected and powered on in order to perform the alignment and panel attachment. Requiring the display panel to be powered on makes it difficult, if not impossible, to fully automate the assembly process. A further disadvantage is that it requires a relatively complex setup.

A disadvantage of known methods which use alignment marks is that marks must be applied to both the TFT panel and the barrier panel. 3D display manufacturers typically perform customization of the barrier panel, but use off-the-shelf TFT panels. Although it is generally straightforward to incorporate alignment marks during barrier panel customization, it is not feasible (technically or economically) for 3D display manufacturers to add alignment marks to the TFT panel itself.

There remains a need for a method which allows 3D display manufacturers to achieve alignment of barrier panels with readily available off-the-shelf TFT panels, without needing to customize the TFT panels. There also remains a need to achieve such alignment without needing to provide power to the TFT panel during the alignment process.

SUMMARY

Embodiments of the present disclosure relate to an apparatus for alignment of a TFT panel and a barrier panel of a 3D display, comprising:
  at least one light source for illuminating pixels in at least one region of the TFT panel and for illuminating at least one region of an exposure pattern of the barrier panel;
  a pattern recognition system for detecting light from the at least one light source that is reflected by or transmitted through the 3D display, to generate alignment data relating to an alignment between the detected illuminated pixels of the TFT transistor and the exposure pattern of the barrier panel; and
  a positioning mechanism for adjusting the relative position between the barrier panel and the TFT panel in relation to the alignment data;
  wherein the at least one light source comprises at least one invisible light source which is operable to emit invisible light outside the visible region of the electromagnetic spectrum.

Embodiments also relate to a method of alignment of a TFT panel and a barrier panel of a 3D display, comprising the steps of:
  illuminating pixels in at least one region of the TFT panel and illuminating at least one region of an exposure pattern of the barrier panel using at least one light source;
  detecting light emitted from the at least one light source that is reflected by or transmitted through the 3D display;
  generating alignment data relating to an alignment between the detected illuminated pixels of the TFT panel and the exposure pattern of the barrier panel; and
  adjusting the relative position between the barrier panel and the TFT panel in relation to the alignment data;
  wherein the at least one light source comprises at least one invisible light source which emits invisible light outside the visible region of the electromagnetic spectrum.

Embodiments therefore use the pixels of the TFT itself and the exposure pattern of the barrier panel as alignment marks. Accordingly, it becomes possible to align the exposure pattern (parallax pattern) of the barrier panel directly with the TFT pixels without any electrical connection being required, and without the need to use specialized predefined alignment patterns around the barrier and TFT panels. This makes it possible to align the TFT and barrier panels accurately in a much simplified manner, and allows for automation of the lamination process. The method and system may be used to perform alignment of essentially any TFT panel with a barrier panel, without customization of the TFT panel itself

BRIEF DESCRIPTION OF THE DRAWINGS

Certain embodiments will now be described, by way of non-limiting example only, with reference to the accompanying drawings in which.

DETAILED DESCRIPTION

Figure 1:
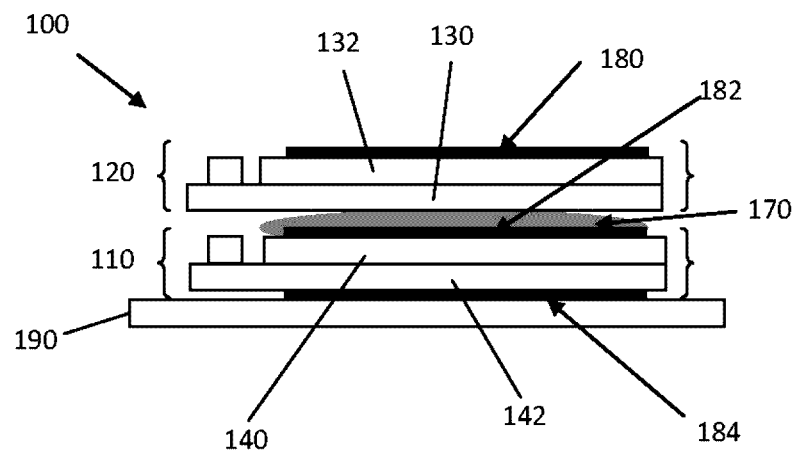
FIG. 1 is a schematic cross-sectional view through a 3D display.
Figure 3:
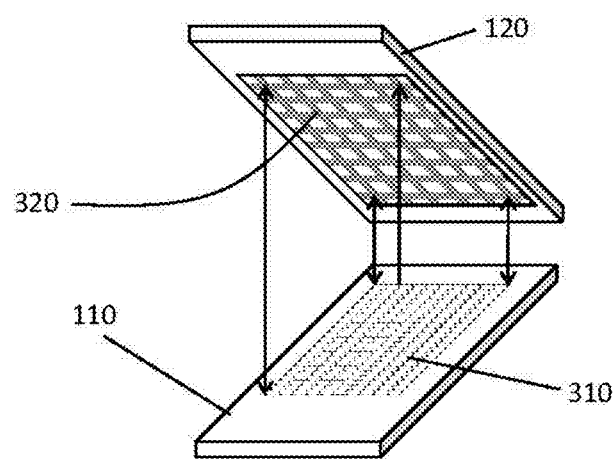
FIG. 3 is a perspective view of parts of the 3D display prior to alignment and assembly.

As shown in FIG. 1, a typical 3D display 100 comprises a TFT panel 110 and a barrier panel 120, affixed by optically clear resin 170. The TFT panel 110 comprises a color filter 142 disposed on a TFT layer 140 comprising a matrix of TFT pixels 310 (FIG. 3). A polarizing filter 182 is disposed on the color filter 142. The barrier panel 120 comprises a lower barrier layer 130 on which an upper barrier layer 132 and polarizing filter 180 are disposed. The lower barrier layer 130 may comprise a series of mutually parallel opaque lines or strips applied to a layer of a transparent material, and the upper barrier layer 132 may be similarly structured but with the lines or strips being orthogonal to those of the lower barrier layer 130. The two series of lines or strips form a barrier grid 320 (FIG. 3).

The upper 132 and lower 130 barrier layers may be aligned with each other in a conventional fashion in order to form the barrier panel 120, e.g. by including fiducial alignment marks on each of the layers 130, 132, the fiducial marks being detectable by a pattern recognition system.

The TFT panel 110 and barrier panel 120 may be disposed on a display backlight 190 with another polarizing filter 184 being interposed between the TFT panel 110 and backlight 190.

Figure 2:
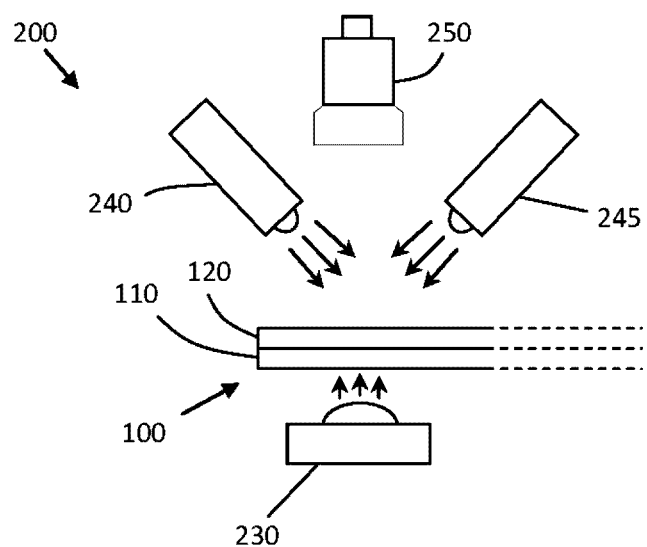
FIG. 2 is a schematic illustration of an embodiment of an apparatus for alignment of panels of a 3D display.

Turning now to FIG. 2, there is shown an embodiment of an apparatus 200 for aligning the TFT panel 110 and barrier panel 120 of a display 100. The apparatus 200 comprises a plurality of light sources 230, 240 and 245. Rearwardly-located light source 230 is positioned to illuminate the TFT panel 110 from behind. Light sources 240 and 245 are positioned to illuminate the TFT panel 110 from the front (i.e., from the barrier panel side). Each of the front-facing light sources 240, 245 is positioned or positionable at an inclined angle relative to the barrier panel 120 side of the 3D display 100. That is, the light sources 240, 245 may be oriented such that the emitted light is incident at a non-zero angle of incidence (the angle of incidence being the angle between the direction of the emitted light, and the normal to the plane of the TFT panel 110).

The apparatus 200 also comprises a pattern recognition system 250. The pattern recognition system 250 comprises an imaging detector, such as a CCD camera or infrared camera, for capturing images of light reflected from the TFT panel 110 and transmitted through gaps in the barrier grid 320 of barrier panel 120, such that the illuminated TFT pixels 310 and the barrier grid 320 are simultaneously observable. The gaps in the barrier grid 320 define an exposure pattern of the barrier panel 120. The pattern recognition system may also comprise pattern recognition software and/or hardware for analysing the captured images to generate alignment data and for giving feedback to an operator, and/or to a panel positioning mechanism, as to the degree of misalignment (if any) between the TFT panel 110 and barrier panel 120.

At least one of the light sources 230, 240, 245 is an invisible light source which emits outside the visible region of the electromagnetic spectrum. In certain embodiments, at least 50% of the emission spectrum is outside the visible region. In other embodiments, 100% of the emission spectrum is outside the visible region.

In certain embodiments, the invisible light source has an emission spectrum with a substantial infrared component. For example, the invisible light source may be an infrared LED with an emission peak at 950 nm, or a halogen light source such as a halogen lamp, which may be coupled to a fiber bundle. Preferably, the invisible light source produces a directional beam of light for illuminating the TFT panel 110.

Advantageously, use of an invisible light source, and in particular an infrared light source, produces the highest quality images of the illuminated region or regions of the TFT panel 110, particularly for 3D displays 100 which include several polarizing filters. This is because polarizers which are used in display panels only need to polarize visible light for processing by the human visual system. Accordingly, such polarizers usually only operate in the visible light region, i.e. approximately in the range 400 nm-700 nm. In addition, it is typical for such polarizers to include UV protective materials for preventing degradation of chemicals in the display panel (which would otherwise shorten the life of the display panel). The use of infrared light allows the TFT panel to be imaged regardless of any UV protection that may be incorporated in the components of the display panel 100. Infrared light may also not be absorbed by certain backlighting units 190. Advantageously, in order to be able to perform alignment of backlit displays for which the absorption spectrum of the backlighting unit is not known in advance, embodiments may provide both a rearwardly positioned invisible light source and a forwardly positioned (and inclined) invisible light source, which can simultaneously or sequentially illuminate the TFT panel. If the backlighting unit strongly absorbs infrared, then the TFT pixels should still be detectable via illumination by the forwardly positioned light source.

It will be appreciated that if the display panel 100 contains fewer polarizers, it may still be possible to use visible light for alignment of the barrier panel and TFT panel during the lamination process. Accordingly, certain embodiments provide a system in which multiple types of light source are used (e.g., a combination of infrared and visible light sources), depending on the configuration of the panels which are to be aligned.

Figure 4:
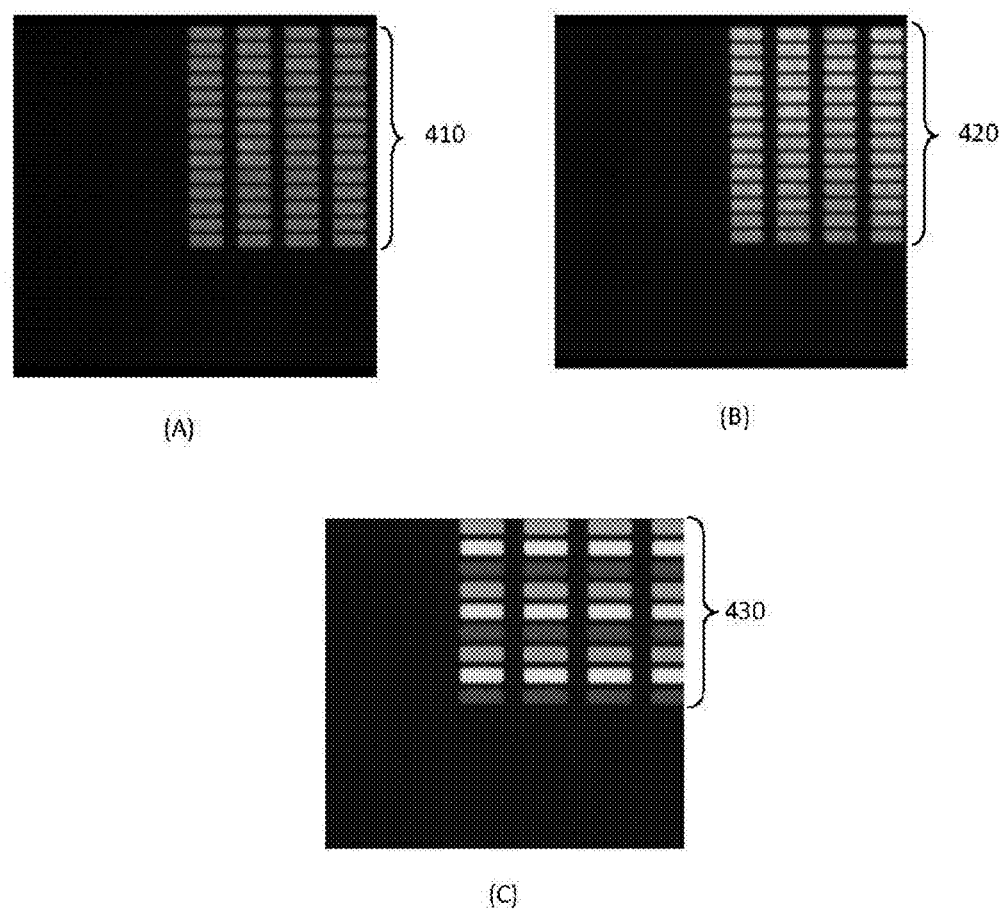
FIGS. 4(A), 4(B) and 4(C) show images of part of a TFT panel under illumination by light sources under different conditions.

FIG. 4 shows exemplary images captured by an imaging detector of pattern recognition system 250 after illumination of the TFT panel 110 by various light sources. In FIG. 4(A), region 410 has been illuminated by an infrared light source 240 (FIG. 2). Individual TFT pixels in the illuminated region 410 are clearly visible. In FIG. 4(B), region 420 has been illuminated by a rearwardly-located infrared light source 230. The brightness of pixels in region 420 is greater than for the frontward illumination of FIG. 4(A) because in FIG. 4(A), the invisible light must pass through a polarizer four times (incident light passes through the polarizers 180 and 182, is reflected from the pixels and then transmitted back through the polarizers 180, 182), whereas in FIG. 4(B) the invisible light only passes through a polarizer three times (through polarizers 184, 182, 180 from the back of the display 110 to the front). FIG. 4(C) shows a region 430 of the TFT panel 110 illuminated by a white LED, positioned behind the panel 110 at position 230 as shown in FIG. 2, for an example of a display where there is no backlighting module 190 or polarizer 184. In such an example, absorption of the visible light may be reduced to a reasonable extent for the visible light to be effective in resolving the pixels of the TFT panel 110.

In each of the examples shown in FIG. 4(A) to 4(C), the pattern produced by illumination of the TFT pixels can be used directly as a fiducial alignment mark, such that the pattern can be aligned with the exposure pattern of the barrier panel 120. For example, two or more corners 112 of the TFT panel 110 (FIG. 5) may be illuminated while the barrier panel 120 is overlaid on the TFT panel 110. If the barrier panel 120 is perfectly aligned then half of the pixels of the illuminated region of the TFT panel 110 should be completely visible (by virtue of the repeating exposure pattern of the barrier panel 120). If they are not, the pattern recognition system 250 can determine the degree of misalignment, and provide the alignment information to a controller which adjusts the position of the barrier panel 120 accordingly until the panels 110, 120 are aligned to within a desired tolerance.

Figure 5:
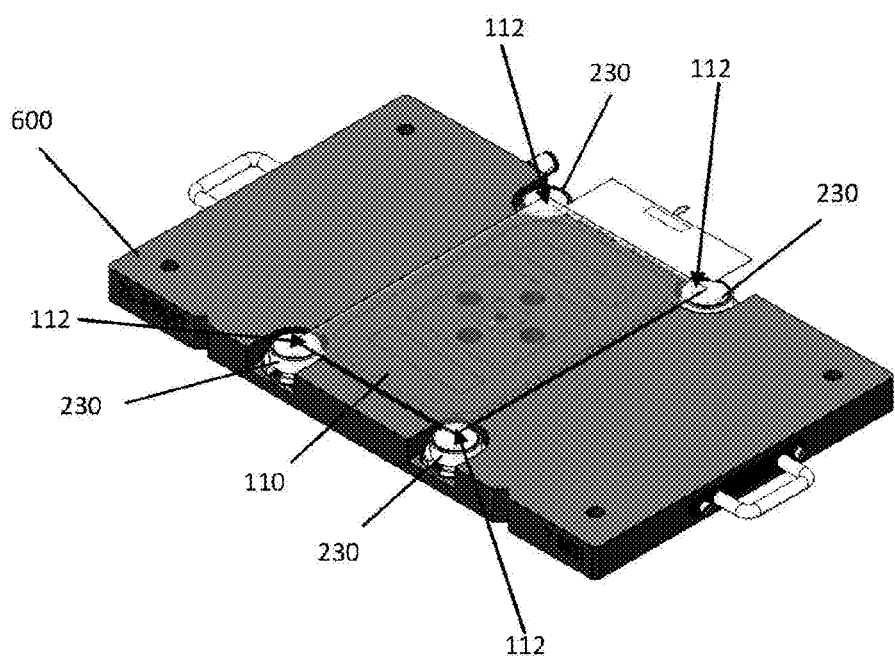
FIG. 5 is an isometric view of a mounting table for an apparatus for use in alignment of 3D display panels.

Referring now to FIG. 5, there is shown an example of a mounting table 600 for use in a method or apparatus as described above. For example, the mounting table 600 may be employed as a lower holding table in alignment apparatus 200 as will be described below and as more particularly illustrated in FIG. 6.

The mounting table 600 incorporates four light sources 230 located near the corner positions of a TFT panel 110 secured to the table, to illuminate the respective corners 112 to use as alignment marks. The TFT panel 110 may be secured by known means, e.g., by use of a vacuum.

Figure 6:
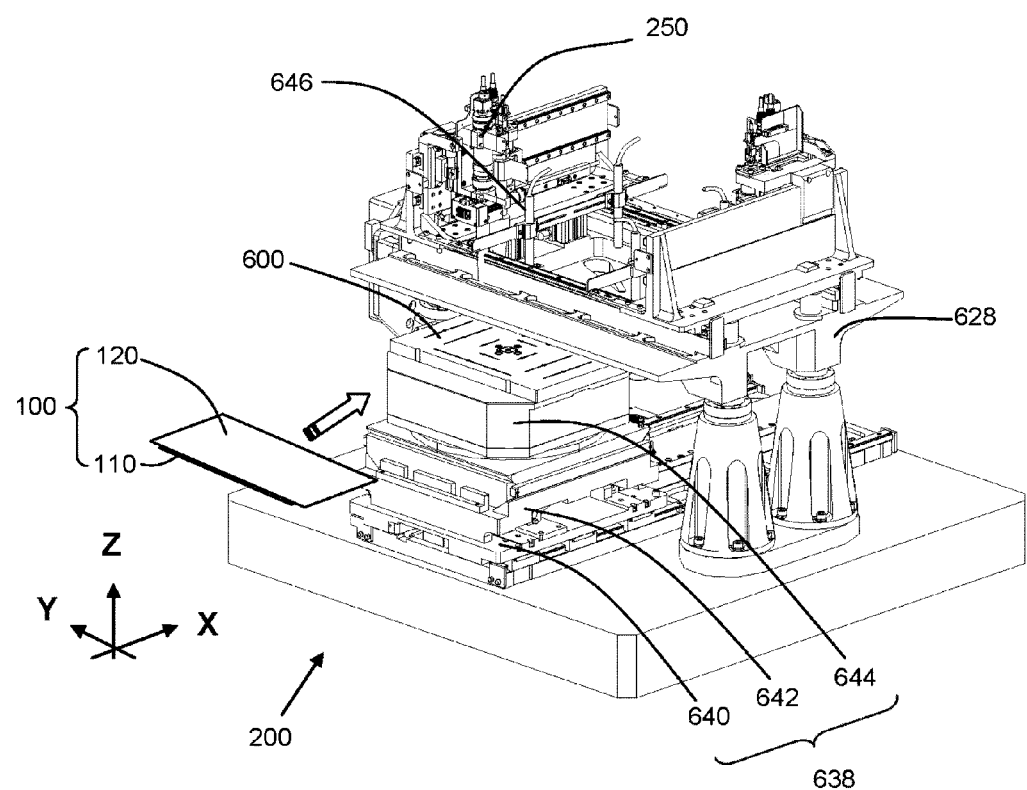
FIG. 6 is an isometric view showing more details of the apparatus of FIG. 2.

FIG. 6 is an isometric view of the real-time alignment apparatus 200. As shown in FIG. 6, the real-time alignment apparatus 200 generally comprises a first substrate holder such as a lower holding table, in particular the mounting table 600 of FIG. 5, and a second substrate holder such as an upper holding table 628. The lower holding table 600 is adapted to receive at least the TFT panel 110 as shown in FIG. 5. In alternative embodiments, a partially laminated substrate 100 comprising barrier panel 120 weakly bonded to TFT panel 110 may be received by lower holding table 600.

For example, a pre-lamination process may be conducted prior to supplying panels 110 and 120 to apparatus 200. In the optional pre-lamination process, an approximate alignment of TFT panel 110 and barrier panel 120 may be performed by any method known in the art (for example, by mechanical alignment), and then applying an optically clear adhesive 170 to one or both panels in order to weakly attach the barrier panel 120 to the TFT panel 110 whilst still allowing the panels 110, 120 to be shifted sideways relative to each other. The adhesive may be uncured, or may even be partially cured provided that relative movement of the panels is still possible.

If a pre-lamination process is used, a partially laminated substrate 100, comprising a second substrate (e.g. barrier panel 120) partially bonded to a first substrate (e.g. TFT panel 110) in a fixed relative position, will be transferred together to the real-time alignment apparatus 200 by a transportation device (not shown). Otherwise, the first substrate 110 is transferred to alignment apparatus 200 and secured (e.g., by a vacuum) to lower holding table 600, and second substrate 120 is then transferred to alignment apparatus 200 such that it is in overlying relationship with first substrate 110, and held by upper holding table 628, for example.

In order to align the substrates 110 and 120, the positions of the substrates 110, 120 can be monitored in real time by pattern recognition system 250. The corners of the TFT panel 110 are illuminated by infrared lighting modules 230 of the lower holding table 600 while the barrier panel 120 is overlaid as described above.

The pattern recognition system 250 captures images of the pixels, and then compares the positions of the detected pixel patterns to the positions of gaps in the exposure pattern of the barrier panel 120, to generate alignment data for determining the relative alignment (or misalignment thereof) between the barrier panel 120 and the TFT panel 110. The alignment data may be used by a controller to drive a positioning mechanism which adjusts the position of the barrier panel, such that the barrier panel 120 and the TFT panel 110 are accurately aligned.

In certain embodiments, any positional error between the positions of the first and second substrates 110, 120 that is determined by the pattern recognition system 250 will be corrected by moving the lower holding table 600, which is coupled to a positioning mechanism in the form of a positioning table 638. The positioning table 638 comprises an X table 640, a Y table 642 mounted on the X table 640, and a theta table 644 which is mounted on the Y table 642, such that an orientation of the first substrate 110 is adjustable along a plane and about a rotational axis perpendicular to the plane (i.e. in X, Y and theta directions) according to the movement of the respective tables 640, 642, 644. This correction method will continue until the placement accuracy is within a required specification. The adhesive resin 170 will be substantially cured by curing devices 646 such that the relative positions of the two substrates 110, 120 can be secured more fully before leaving the real-time alignment apparatus 200. Alternatively, the positioning table 638 may be coupled to the upper holding table 628 or to both the lower holding table 600 and upper holding table 628 for aligning the first and second substrates 110, 120.

The skilled person will appreciate that various modifications and variations of the above embodiments are possible without departing from the scope of the invention. For example, in addition to (or instead of) the TFT panel-facing light sources 230 disposed within the mounting table 600, one or both of the barrier panel-facing light sources 240, 245 (as shown in FIG. 2) may be disposed within apparatus 200 or by any suitable mounting mechanism in order to be able to illuminate the TFT and barrier panels 110, 120 from the barrier panel side at an inclined angle. In alternative embodiments, one or both of the light sources 240, 245 may be mounted to a separate apparatus and then positioned relative to apparatus 200 in order to illuminate the barrier panel 120 side of the display 100.

The invention claimed is:

1. An apparatus for alignment of a thin-film transistor panel and a barrier panel of a three-dimensional display, the apparatus comprising:
   at least one light source for illuminating pixels in at least one region of the thin-film transistor panel and for illuminating at least one region of an exposure pattern of the barrier panel, wherein the at least one light sources comprises at least one invisible light source which is operable to emit invisible light outside the visible region of the electromagnetic spectrum;
   a pattern recognition system for detecting light emitted from the at least one light source including the invisible light source that is reflected by or transmitted through the three-dimensional display, to generate alignment data relating to an alignment between the detected illuminated pixels of the thin-film transistor and the exposure pattern of the barrier panel; and a positioning mechanism for adjusting the relative position between the barrier panel and the thin-film transistor panel in relation to the alignment data.

2. The apparatus of claim 1, wherein the at least one invisible light source is operable to emit invisible light that is predominantly outside the visible region of the electromagnetic spectrum.

3. The apparatus of claim 2, wherein the at least one invisible light source is an infrared light source.

4. The apparatus of claim 1, wherein the at least one invisible light source is positionable on the barrier panel side of the three-dimensional display.

5. The apparatus of claim 4, wherein the at least one invisible light source is positionable at an inclined angle relative to the barrier panel side of the three-dimensional display.

6. The apparatus of claim 1, wherein the at least one invisible light source is positionable on the thin-film transistor panel side of the three-dimensional display.

7. An apparatus for alignment of a thin-film transistor panel and a barrier panel of a three-dimensional display, the apparatus comprising:

at least one light source for illuminating pixels in at least one region of the thin-film transistor panel and for illuminating at least one region of an exposure pattern of the barrier panel;

a pattern recognition system for detecting light emitted from the at least one light source that is reflected by or transmitted through the three-dimensional display, to generate alignment data relating to an alignment between the detected illuminated pixels of the thin-film transistor and the exposure pattern of the barrier panel; and a positioning mechanism for adjusting the relative position between the barrier panel and the thin-film transistor panel in relation to the alignment data;

wherein the at least one light source comprises at least one invisible light source which is operable to emit invisible light outside the visible region of the electromagnetic spectrum; and wherein the at least one invisible light source comprises an invisible light source positionable on the thin-film transistor panel side of the three-dimensional display and an invisible light source positionable on the barrier panel side of the three-dimensional display.

* * * * *